P. H. KELLS.
Brick-Machine.
No. 8,867. Reissued Aug. 19, 1879.
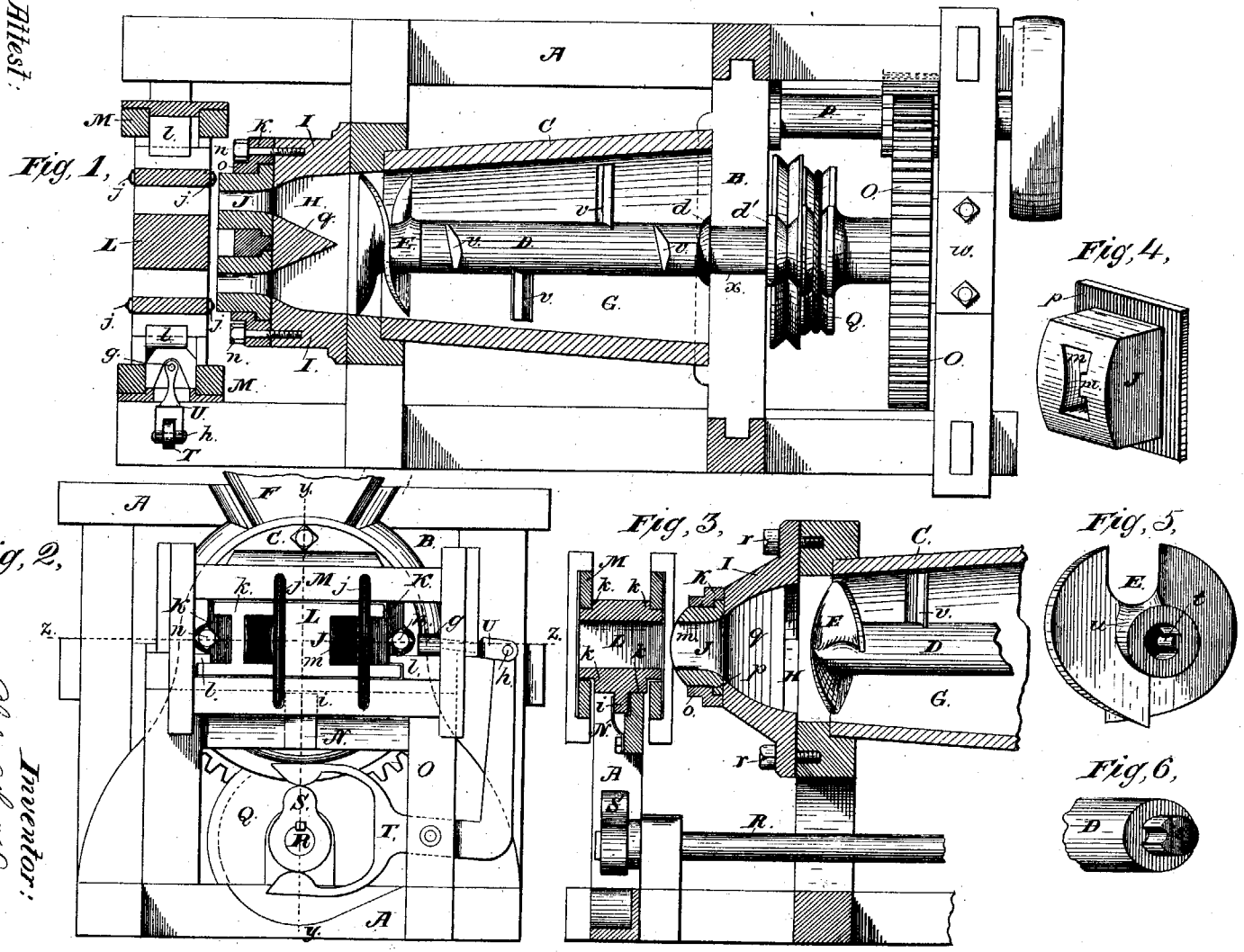
Attest:
Geo. T. Smallwood Jr.
Walter Allen
Inventor:
Philip H. Kells
By Knight Bros
Attys.
N. PETERS, PHOTO-LITHOGRAPHER, WASHINGTON, D. C.

UNITED STATES PATENT OFFICE.

PHILIP H. KELLS, OF ADRIAN, MICHIGAN.

IMPROVEMENT IN BRICK-MACHINES.

Specification forming part of Letters Patent No. 124,590, dated March 12, 1872; Reissue No. 8,867, dated August 19, 1879; application filed July 24, 1879.

*To all whom it may concern:*

Be it known that I, PHILIP H. KELLS, of Adrian, in the county of Lenawee and State of Michigan, have invented a new and useful Improvement in Brick-Machines, of which the foling is a specification.

This is a machine of the type in which the clay is expressed in continuous bars from the pugging and tempering chamber, and then cut into lengths by automatic devices.

The subject of my invention is a horizontal brick-machine constructed with a tub supported at its ends in suitable standards, and with a nose-piece or die-holder projecting forward from one of the standards, and adapted for the attachment of suitable dies, which are formed to deliver the clay in one or more horizontal columns on edge instead of flatwise, as heretofore, the advantages of running the columns of clay on edge being that they are less liable to distortion, and in better shape for cutting into bricks.

My invention further consists in a brick-machine having a horizontal shaft, provided with a collar in rear of one of its bearings to confine the shaft against forward movement when the machine is running empty.

The invention consists, further, in a peculiarly-shaped double throat-piece; also, in a mode of attaching and supporting removable dies; also, in a yielding box to receive the proper length of clay for one or more sets of bricks, and to hold the same while the bricks are being severed; also, in a sliding cut-off adapted to sever the bricks at each end; also, in a combination of cam, forked lever, and connecting-rod for operating the cut-off; also, in an expelling-screw cast with a shaft-socket and feather.

Figure 1 is a plan of my improved machine, partly in horizontal section, on the line *z z*, Fig. 2. Fig. 2 is an end elevation. Fig. 3 is a vertical longitudinal section on the line *y y*, Fig. 2. Fig. 4 is a perspective of one of the dies. Fig. 5 is a perspective of the expelling-point. Fig. 6 is a perspective of the shaft end adapted to receive the same.

The frame A of the machine may be of wood, as indicated, or of metal, as preferred, and of any suitable shape. Mounted centrally in this, in front of a vertical abutment or standard, B, forming the rear end of the same, is a horizontal tapering tub, C, which may also be of any preferred construction. Axially within the tub C is a shaft, D, having a bearing, *x*, in the abutment B, and another, *w*, behind the same, with others, if preferred, and provided with pugging and tempering blades *v*, set in oblique or spiral position, to adapt them to force the clay forward through the tub as the shaft is rotated.

The main back-pressure of the shaft developed by the resistance of the clay is taken up by the abutment at the rear end of the shaft; but some of this back-pressure may be taken up by a collar, *d*, in front of the intermediate standard B, which collar also serves to exclude clay from the shaft-box *x*. The shaft is further provided with a collar, *d'*, on the rear side of the standard B, which serves to confine the shaft within its bearings and prevent any forward movement thereof when running empty. A spiral point or expelling-screw, E, is also attached to the outer end of said shaft, being cast with a socket, *u*, with feathers *t*, to receive a grooved tenon, *s*, on the end of the shaft. Said point is thus adapted to be made with a small hub and very deep spiral flanges, which gives large clay-space and works more freely.

A hopper, F, provides for the introduction of clay into the chamber G, in which said pugging and tempering shaft D and expelling-point E work. This chamber is extended by the cavity H of a throat-piece, I, attached by bolts *r*, or their equivalent, which cavity is peculiar in being of angular form to prevent the rotation of the clay, and divided, by one or more partitions, *q*, into compartments tapering to the respective dies J, through which the clay solidified in this throat is forced in continuous bars by the point E, as in other similar machines. These dies are removable, being constructed (see Fig. 4) with flanges *p*, and are attached by a face-plate, K, with flanges *o* to support the outer ends of the dies, and secured by bolts *u*. They are further constructed with sides *m*, convex or ribbed, to produce bricks with concave or recessed sides. Good sharp corners are thus insured, and the bricks rendered superior for building purposes on account of the hold afforded the mortar.

By applying the dies, as shown, with the length of the aperture vertical and its shorter diameter in a horizontal line, the columns of clay are delivered on edge, so that when cut up the bricks will stand in couples side by side, ready for bearing off, and not requiring to be turned up on edge by hand, as is the case when the clay is delivered from the machine flatwise.

Immediately in front of the dies J is a box, L, to receive the bars of clay as they issue therefrom. This is mounted in short longitudinal ways *l*, and furnishes transverse ways *k* for a cut-off, M, composed of a light frame, with plain thin strips of steel *j* for knives. This box, as represented, is of sufficient depth to receive one set of bricks, the clay being cut off at each end. I propose making it of sufficient length to contain two or more sets and employing more knives. This box is supported against backward movement along the ways *l* by a spring, N, engaging with a flange, *i*, on the bottom of the same, which yields sufficiently to adapt the box to move with the bars of clay while the knives are in the same.

The tub-shaft D is driven through reducing-gear O from a parallel driving-shaft, P. The cut-off M receives the reciprocating motion from said tub-shaft through further reducing-gear Q, (cone-pulleys and band, as represented, or their equivalent,) a third shaft, R, a cam, S, thereon, a forked elbow-lever, T, and a link, U, with horizontal and vertical pivots *h g*. Quick positive movements are thus imparted.

Having thus described my invention, the following is what I claim as new and desire to secure by Letters Patent:

1. A horizontal brick or tile machine constructed with a tub supported at its ends in the standards, and with a nose-piece or die-holder on the front standard.

2. The combination of the front standard supporting the extremity of the tub, a nose-piece attached directly to said standard, and a die secured to the nose-piece, all substantially as herein described.

3. A horizontal brick-machine provided with a removable die or dies, formed to deliver one or more columns of clay on edge, adapted to be severed into bricks, as explained.

4. In a horizontal brick-machine, a shaft, D, having a confining-collar, *d'*, on the rear of one of its bearings to secure it against forward movement.

5. The throat-piece I, constructed as described, with the angular cavity H and partition *q*, in combination with the nozzle molds or dies J J attached thereto, substantially as and for the purposes specified.

6. The removable dies J, constructed with the flanges *p*, in combination with the face-plate K, with its flanges *o* and attaching-bolts *n*, substantially as shown and described, for the purpose specified.

7. The yielding box L, constructed of sufficient depth to receive and support the whole length of one or more sets of bricks while they are being severed and trimmed, as shown and described.

8. In combination with the box L, the cut-off M, adapted to sever the clay into bricks, as and for the purpose set forth.

9. The combination, with the yielding cut-off M, of the link U, with vertical and horizontal pivots *g h*, forked lever T, and cam S, constructed and operating substantially as shown and described, for the purpose specified.

10. The expelling-point E, constructed with deep spiral flanges and with the socket *u* and feather *t*, to receive the grooved tenon *s* on the end of the tub-shaft, as shown, for the purposes set forth.

PHILIP H. KELLS.

Witnesses:
OCTAVIUS KNIGHT,
WALTER ALLEN.